(12) United States Patent
Ryu et al.

(10) Patent No.: US 7,926,465 B2
(45) Date of Patent: Apr. 19, 2011

(54) IMPULSE CHARGER FOR MOTOR VEHICLE ENGINES

(75) Inventors: In Sang Ryu, Hwasung-si (KR); Jin Yong Kong, Sungnam-si (KR); Yong Yun Hwang, Ahnyang-si (KR); Seong Hyuk Kang, Hwasung-si (KR); Woo Tae Kim, Suwon-si (KR); Seung Woo Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 320 days.

(21) Appl. No.: 12/325,196

(22) Filed: Nov. 29, 2008

(65) Prior Publication Data

US 2009/0151802 A1  Jun. 18, 2009

(30) Foreign Application Priority Data

Dec. 14, 2007 (KR) .................. 10-2007-0131601
Apr. 11, 2008 (KR) .................. 10-2008-0033827

(51) Int. Cl.
*F01L 15/18* (2006.01)
*F02B 13/10* (2006.01)

(52) U.S. Cl. ....................................... 123/337

(58) Field of Classification Search .................. 123/337, 123/336; 137/595

See application file for complete search history.

(56) References Cited

U.S. PATENT DOCUMENTS 7,249,584 B2 * 7/2007 Rozario et al. ............. 123/198 F
7,467,625 B1 * 12/2008 Wu et al. ........................ 123/337

FOREIGN PATENT DOCUMENTS

| EP | 0628712 A1 | 12/1994 |
| JP | 59-65685 A | 4/1984 |
| JP | 2002-242683 A | 8/2002 |
| JP | 2007-182841 A | 7/2007 |

* cited by examiner

*Primary Examiner* — Hieu T Vo
(74) *Attorney, Agent, or Firm* — Morgan, Lewis & Bockius LLP (57) ABSTRACT

An impulse charger for motor vehicle engines include impulse valves driven using driving force continuously generated by a driving apparatus so as to be instantaneously opened and closed at a high speed by a link unit in which link members are interconnected, and in which the impulse valves for all cylinders are simultaneously driven. Thus, the impulse charger provides simple drive control, reduction in necessary components, and an efficient mounting space, guarantees easy manufacturing and mounting at a low cost, and prevents noise from being generated when the impulse valves are operated.

16 Claims, 12 Drawing Sheets

//IMPULSE CHARGER FOR MOTOR VEHICLE ENGINES

CROSS-REFERENCE TO RELATED APPLICATION

The present application claims priority of Korean Patent Application Nos. 10-2007-0131601 and 10-2008-0033827 filed on Dec. 14, 2007 and Apr. 11, 2008, respectively, the entire contents of which applications is incorporated herein for all purposes by this reference.

BACKGROUND OF THE INVENTION

1. Field of the Invention

The present invention relates to an impulse charger for motor vehicle engines and, more particularly, to an impulse charger for motor vehicle engines, in which impulse valves are driven using driving force continuously generated by a driving apparatus so as to be instantaneously opened or closed at a high speed by a link unit in which link members are interconnected, and in which the impulse valves for all cylinders are simultaneously driven, thereby providing simple drive control, reduction in necessary components, and an efficient mounting space, guaranteeing easy manufacturing and mounting at a low cost, and preventing noise from being generated when the impulse valves are operated.

2. Description of Related Art

In general, an impulse charger for motor vehicle engines is new technology for improving low-speed and middle-speed performance and fuel efficiency. Particularly, the impulse charger increases volume efficiency by controlling the opening or closing of intake runners of the engine in a manner such that valves, which are mounted so as to communicate with the intake runners and have a very rapid lift time, are instantaneously opened or closed at an optimal point of time (pressure difference and pulsation effect) in the process of drawing air.

Up to now, the impulse charger has neither been applied nor mass-produced for the engine, and thus has been steadily developed by some motor vehicle makers. The recently developed impulse charger is based on a motor driving system, in which impulse valves are configured to be driven for cylinders by respective impulse motors in the respective intake runners of a cylinder head, or on an electromagnetic driving system, in which impulses valves are opened using the electromagnetic force of electromagnets and are closed by the restoring force of springs.

In the case of this impulse charger, the impulse valves for the respective cylinders are separately driven by the respective motors, or by the respective electromagnets or springs when opened or closed. As a result, when the impulse valves are operated, noise is generated, the cost of production is increased. Further, the number of necessary components is increased to thus make mounting and manufacturing difficult. Thus, the impulse charger fails to be applied to the engine and to be mass-produced.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention provide an impulse charger for motor vehicle engines, in which impulse valves are driven using driving force continuously generated by a driving apparatus so as to be instantaneously opened or closed at a high speed by a link unit in which link members are interconnected, and in which the impulse valves for all cylinders are simultaneously driven, thereby providing simple drive control, reduction in necessary components, and an efficient mounting space, guaranteeing easy manufacturing and mounting at a low cost, and preventing noise from being generated when the impulse valves are operated.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIGS. 4(a) to 4(l) are an operational diagram sequence explaining the operational principle of an exemplary link unit according to the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
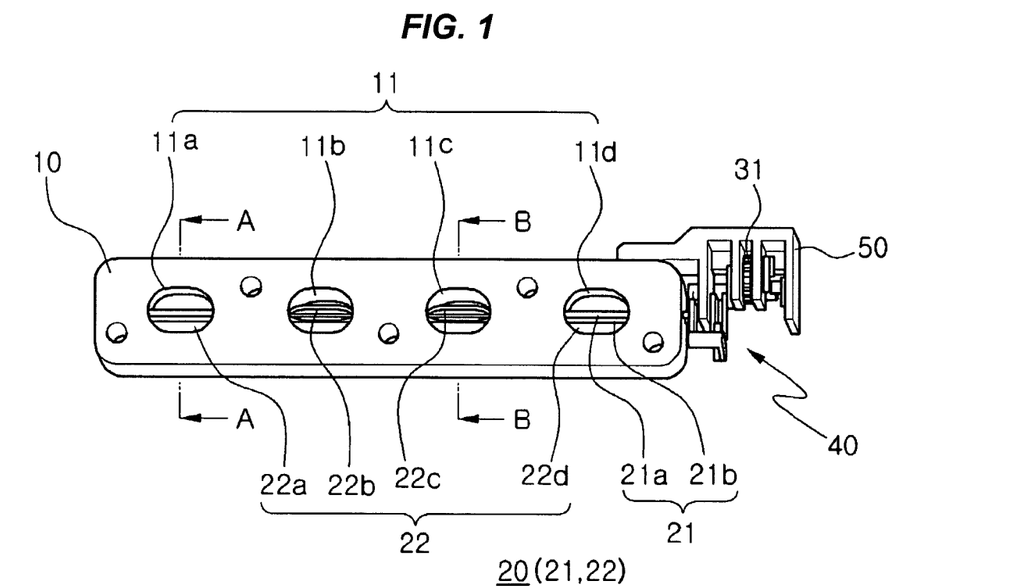
FIG. 1 is a schematic perspective view illustrating an exemplary impulse charger for motor vehicle engines according to the present invention.

FIG. 1 is a schematic perspective view illustrating an impulse charger for motor vehicle engines according to an exemplary embodiment of the present invention. FIGS. 2(a) and 2(b) are a cross-sectional views taken along the lines A-A and B-B of FIG. 1, respectively.

As illustrated in FIG. 1, the impulse charger for motor vehicle engines according to an exemplary embodiment of the present invention includes an impulse block 10 through which intake holes 11 pass so as to communicate with intake runners (not shown) of the motor vehicle engine, an impulse valve 20 that opens or closes the intake holes 11, a driving apparatus 30 (see FIG. 3) that drives the impulse valve 20, and at least one link unit 40 that is connected by at least one link member and transmits a driving force from the driving apparatus 30 to the impulse valve 20.

The driving apparatus 30 (see FIG. 3) generates a continuous driving force in order to drive the impulse valve 20. This continuous driving force is transferred through the link unit 40, and then is transmitted to the impulse valve 20 such that the impulse valve 20 is opened or closed at predetermined periods.

Specifically, the driving apparatus 30 continuously generates a predetermined rotating force using, for instance, a motor. This continuous rotating force is transferred through the link unit 40 connected by at least one link member, and then is transmitted to the impulse valve 20. Thereby, the impulse valve 20 is operated at predetermined periods.

Thus, the impulse charger for motor vehicle engines according to various embodiments of the present invention is not driven in a manner such that the impulse valve 20 is opened or closed at opening or closing points of time by repeatedly transmitting a driving force using motors or electromagnets, but in a manner such that the impulse valve 20 is opened or closed by constantly continuously generating a driving force and by transmitting this continuous driving force to the impulse valve 20 through the link unit 40 at predetermined periods. At this time, according to magnitude of the driving force, for example, according to magnitude of a rotating speed of the motor, the period at which the impulse valve 20 is opened or closed through the link unit 40 may be changed.

Thus, the impulse charger for motor vehicle engines according to various embodiments of the present invention is operated with low noise, and is easily manufactured and mounted due to reduction of necessary components and simplification of control logic.

Figure 2:
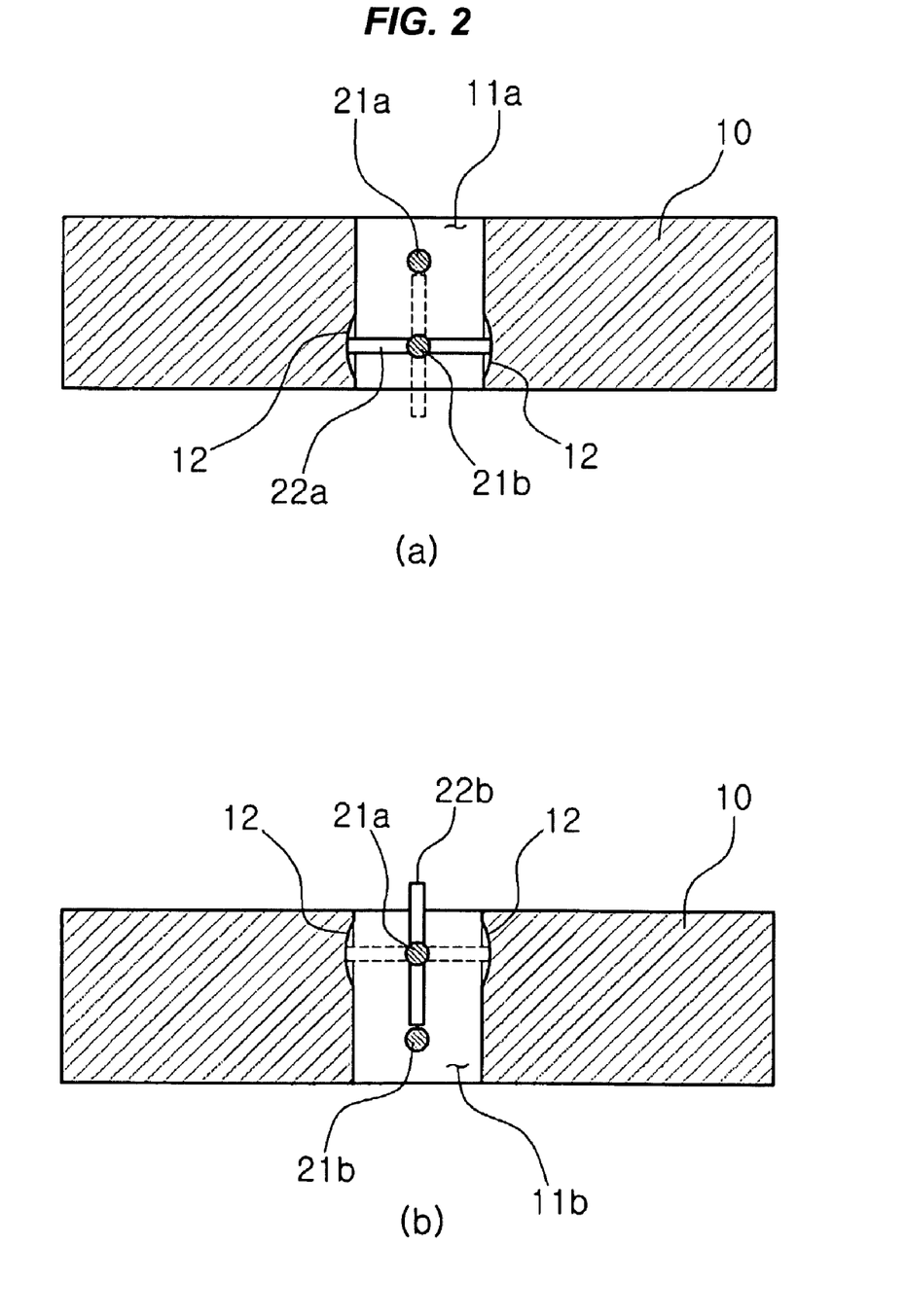
FIGS. 2(a) and 2(b) are a cross-sectional views taken along the lines A-A and B-B of FIG. 1.

Meanwhile, as illustrated in FIGS. 1 and 2, the impulse valve 20 includes valve rotating shafts 21 that are rotatably coupled to the impulse block 10 across the intake holes 11, and baffles 22 that are mounted on outer circumferences of the valve rotating shafts 21 in a direction perpendicular to the axis of each valve rotating shaft 21. At this time, the baffles 22 are shaped corresponding to a cross-sectional shape of each intake hole 11. As the valve rotating shafts 21 rotate, the baffles 22 serve to open or close the intake holes 11. According to the structure of the impulse valve 20, the driving force generated by the driving apparatus 30 can be transmitted to the valve rotating shafts 21 through the link unit 40, thereby generating the rotating force from the valve rotating shafts 21.

Further, in this structure of the impulse valve 20, the link unit 40 can be configured so that the driving apparatus 30 generates a rotating force in a one-way direction, and so that this one-way rotating force generated by the driving apparatus 30 is transmitted as a reciprocating-rotating force to the valve rotating shafts 21. Thus, when the reciprocating-rotating force is generated by the driving apparatus 30, the valve rotating shafts 21 are alternately rotated at predetermined periods by the link unit 40, and thus the impulse valve 20 is operated so as to open or close the intake holes 11.

Meanwhile, as illustrated in FIG. 1, the impulse block 10 has the plurality of intake holes 11 so as to correspond to the intake runners according a type of the motor vehicle engine. In an exemplary embodiment of the present invention as shown in FIG. 1, the impulse block 10 is applied to a four-cylinder engine, and thus has four intake holes 11. All of the intake holes 11 are not simultaneously opened or closed. Specifically, the intake holes 11 are opened or closed at the same periods as that at which the pistons of the engine are reciprocated. From the viewpoint of characteristics of the motor vehicle engine, the intake holes 11 are generally designed in a manner so that two of them are simultaneously opened or closed in a pair. In this manner, when a plurality of the intake holes 11 are formed, a plurality of the valve rotating shafts 21 are also mounted, and are preferably configured so that the paired intake holes 11 can be opened or closed through the respective valve rotating shafts 21. In other words, the valve rotating shafts 21 are mounted corresponding to the number obtained by dividing the total number of intake holes 11 by the number of paired intake holes that are opened or closed at the same time. The valve rotating shafts 21 are preferably provided with the respective baffles 22 capable of opening or closing the intake holes 11 that are simultaneously opened or closed.

In detail, the intake holes 11 illustrated in FIG. 1 includes first, second, third and fourth intake holes 11a, 11b, 11c and 11d, which are sequentially disposed from the left-hand side. The first and fourth intake holes 11a and 11d are simultaneously opened or closed, and the second and third intake holes 11b and 11c are simultaneously opened or closed. Thus, the valve rotating shafts 21 includes two ones that correspond to the number obtained by dividing the total number of intake holes 11 by the number of paired intake holes that are simultaneously opened or closed, namely first and second valve rotating shafts 21a and 12b that are sequentially mounted from the top. At this time, as illustrated in FIGS. 1 and 2, these valve rotating shafts 21 are preferably mounted in parallel to a horizontal plane in order to minimize a mounting space. Furthermore, the valve rotating shafts 21 are preferably spaced apart from each other in a predetermined distance such that they do not cause interference with the respective baffles 22 when the baffles 22 are rotated. Further, the baffles 22b and 22c for the first valve rotating shaft 21a can be installed at a predetermined angle including a right angle with respect to each other such that the corresponding intake holes 11 are opened or closed at different points of time, as illustrated in FIGS. 1 and 2. This is equally applied to the baffles 22a and 22d for the second valve rotating shaft 21b.

In this case, the link units 40 are provided corresponding to the mounted valve rotating shafts 21 as illustrated in FIG. 1. Preferably, the driving force of the driving apparatus 30 is transmitted to the valve rotating shafts 21 through the respective link units 40.

As described above, the baffles 22 for the valve rotating shafts 21 are shaped corresponding to the cross-sectional shapes of the intake holes 11. Here, for the case in which the intake holes 11 are closed by the baffles 22, each intake hole 11 is preferably provided with a recess 12 in the inner circumference thereof which is dented along a rotational path of the corresponding baffle 22 such that inhaled air is prevented from leaking out through the intake hole 11, as illustrated in FIGS. 2(a) and 2(b).

Figure 3:
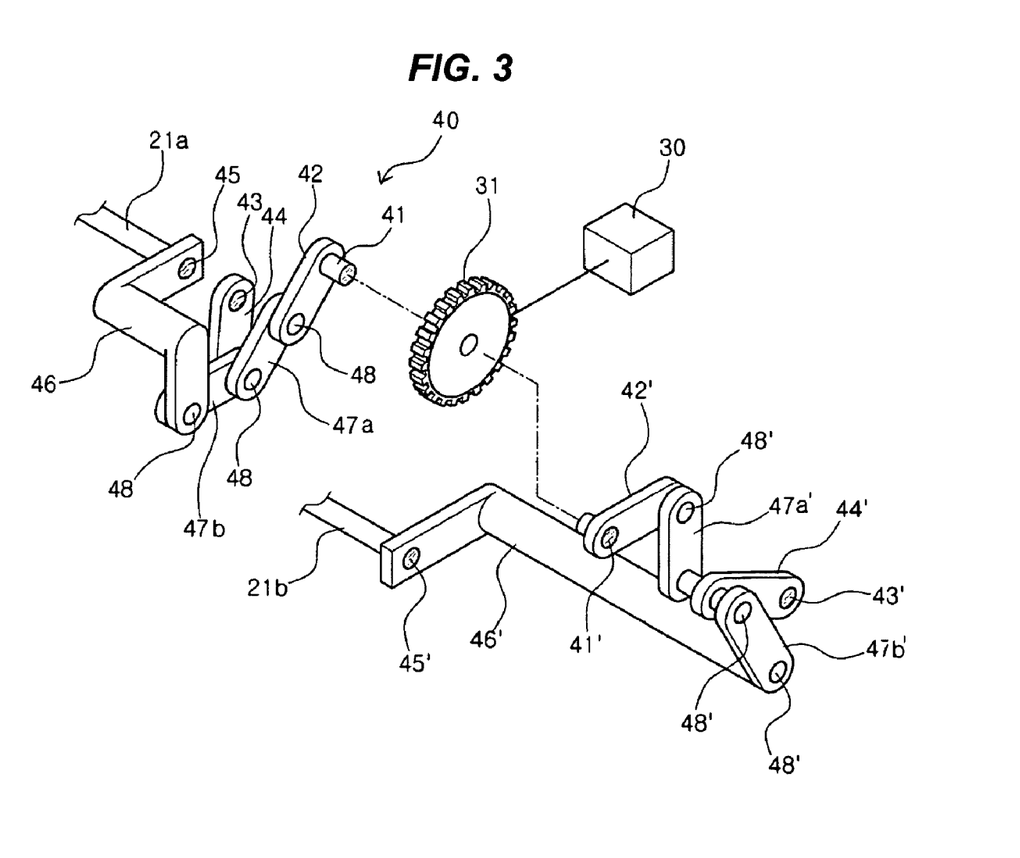
FIG. 3 is an exploded perspective view illustrating the structure of an exemplary link unit according to an aspect of the present invention.

FIG. 3 is an exploded perspective view illustrating the structure of a link unit according to an exemplary embodiment of the present invention. FIG. 4(a) TO 4(l) are an operational diagram explaining the operational principle of a link unit according to various embodiments of the present invention.

Figure 4:
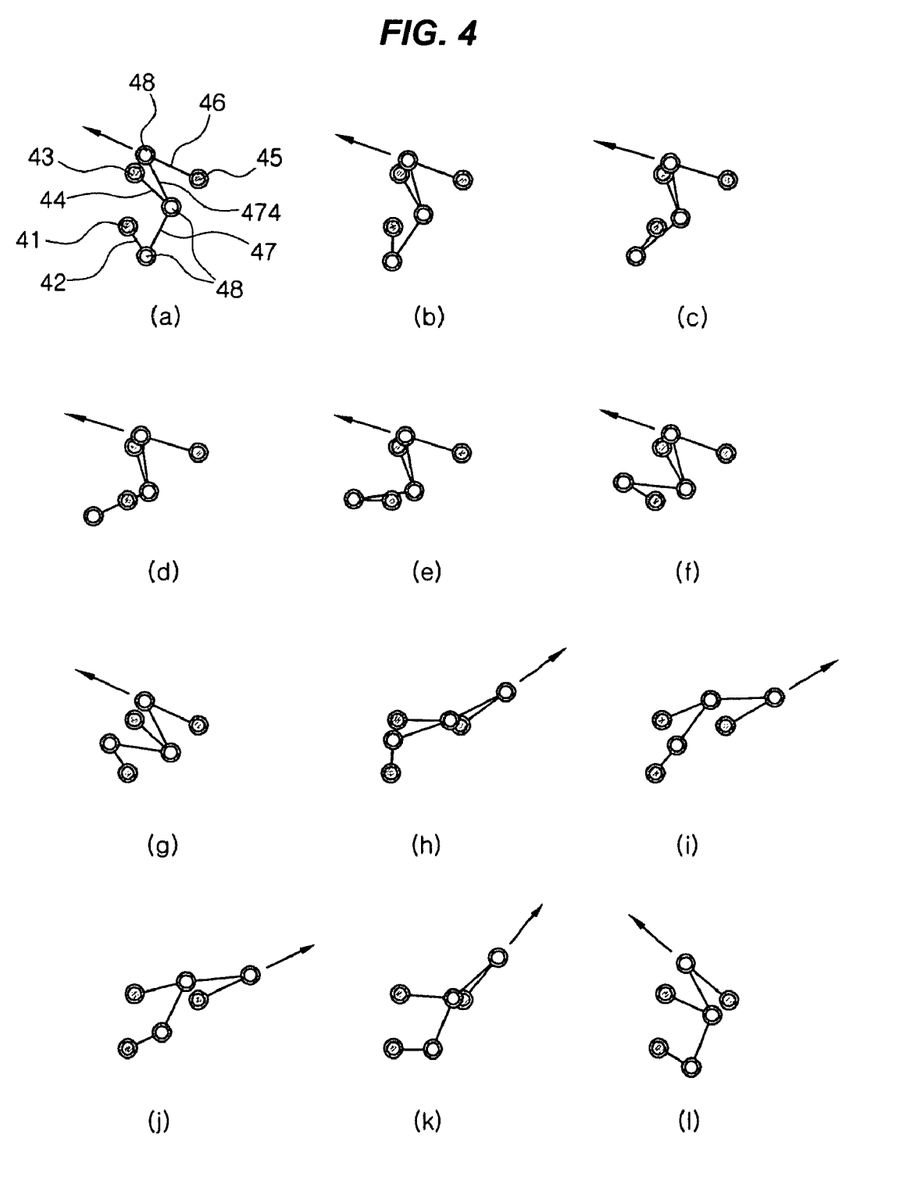

As illustrated in FIGS. 3 and 4, the link unit according to an exemplary embodiment of the present invention is made up of a six-bar linkage, which includes a driving link 42, a driven link 44, an output link 46, and first and second link plates 47a and 47b. One will appreciate that other suitable configurations may be utilized.

The driving link 42 and the output link 46 are mounted to a driving shaft 41 and an output shaft 45 so as to be able to be rotated around the driving shaft 41 and the output shaft 45, respectively. At this time, the driving shaft 41 and the output shaft 45 are rotatably fixed. The driven link 44 is mounted to a driven shaft 43, which is rotatably fixed, so as to be able to rotate around the driven shaft 43. Further, the driving link 42 and the driven link 44 are rotatably connected to the first link plate 47a at first ends thereof through link pins 48, and the driven link 44 and the output link 46 are rotatably connected to the second link plate 47b at first ends thereof through link pins 48.

In this state, when the driving shaft 41 rotates, the driving link 42 rotates. Then, the driven link 44 connected to the driving link 42 through the first link plate 47a rotates. In this manner, when the driven link 44 rotates, the output link 46 connected to the driven link 44 through the second link plate 47b rotates. At this time, rotational speed and angle of each link are determined by a length of each link, a position of each rotating shaft, etc. so as to generate various trajectories. According to this exemplary embodiment and various embodiments of the present invention, preferably, when the driving link 42 rotates at a constant speed in one direction, the driven link 44 performs rotation and reciprocation with acceleration within a predetermined section, and the output link 46 rotates and reciprocates with greater acceleration within a predetermined section compared to the driven link 44.

This operation will be described in greater detail with reference to FIG. 4(a) TO 4(l), which sequentially illustrate motions of a link unit according to various embodiments of the present invention. While the driving link 42 gradually rotates within a rotational section from the state (a) to the state (g), the rotational angle of the output link 46 is little changed as indicated by arrow. While the driving link 42 rotates within a rotational section from the state (g) to the state (h), the output link 46 rapidly rotates in the same direction. In other words, the output link 46 rotates with very great acceleration within the rotational section from the state (g) to the state (h). Similarly, while the driving link 42 rotates within a rotational section from the state (k) to the state (l), the output link 46 rapidly rotates in an opposite direction.

Thus, the impulse charger according to this exemplary embodiment and various embodiments of the present invention is preferably designed to couple each valve rotating shafts 21 to the corresponding output shaft 45, which rotates together with the output link 46, so as to rotate together with the output shaft 45. Thereby, a function of the impulse valve 20 required for an instantaneous rapid lift time that is a characteristic of the impulse charger can be smoothly performed.

As illustrated in FIG. 3, the link unit 40 can be configured on the basis of this principle. In the case in which the number of valve rotating shafts 21 is at least two, the link units 40, the number of which is equal to the number of valve rotating shafts 21, are preferably mounted such that they can be connected to the respective valve rotating shafts 21. Further, as illustrated in FIG. 3, these link units 40 are preferably configured to be able to be simultaneously driven by a single driving wheel 31, which is driven by one driving apparatus 30. At this time, each link unit 40 can be driven with a phase difference according to the period at which the intake holes 11 are opened or closed. Preferably, the driving shaft 41 of each link unit 40 is simultaneously driven by the driving wheel 31 such that each link unit 40 is driven.

Figure 5:
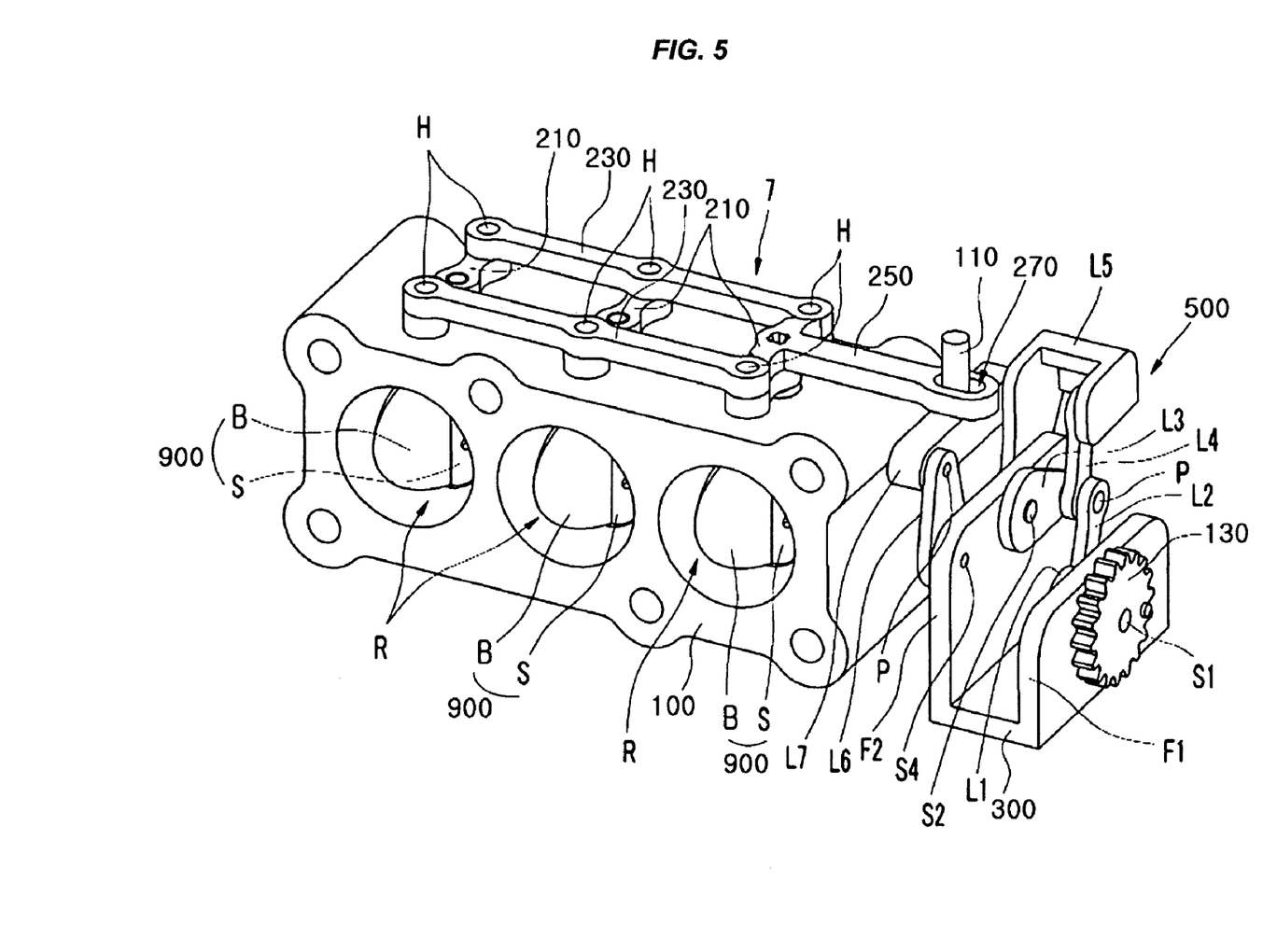
FIGS. 5 and 6 are top and bottom perspective views illustrating an exemplary impulse charger according to the present invention.
Figure 6:
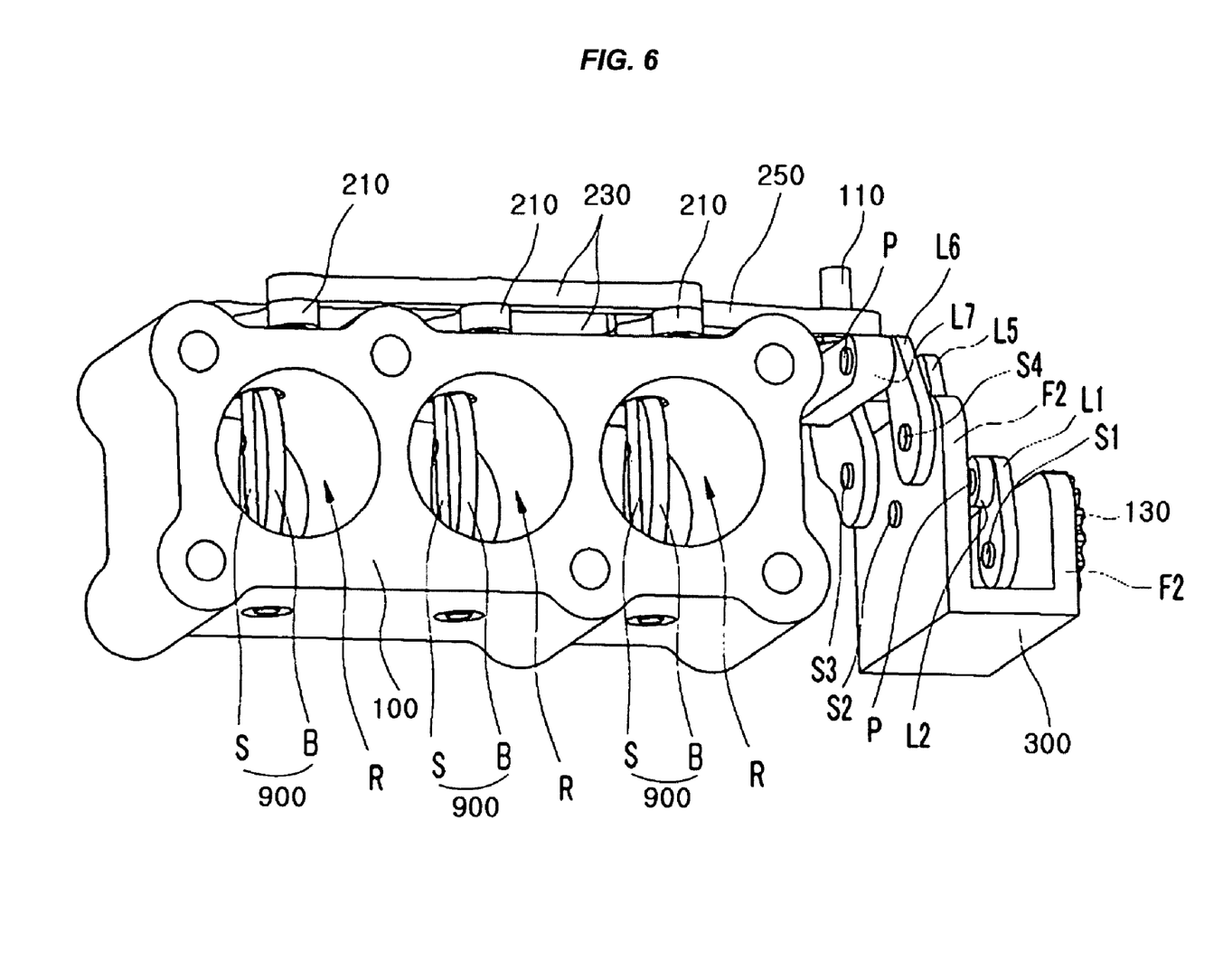
Figure 7:
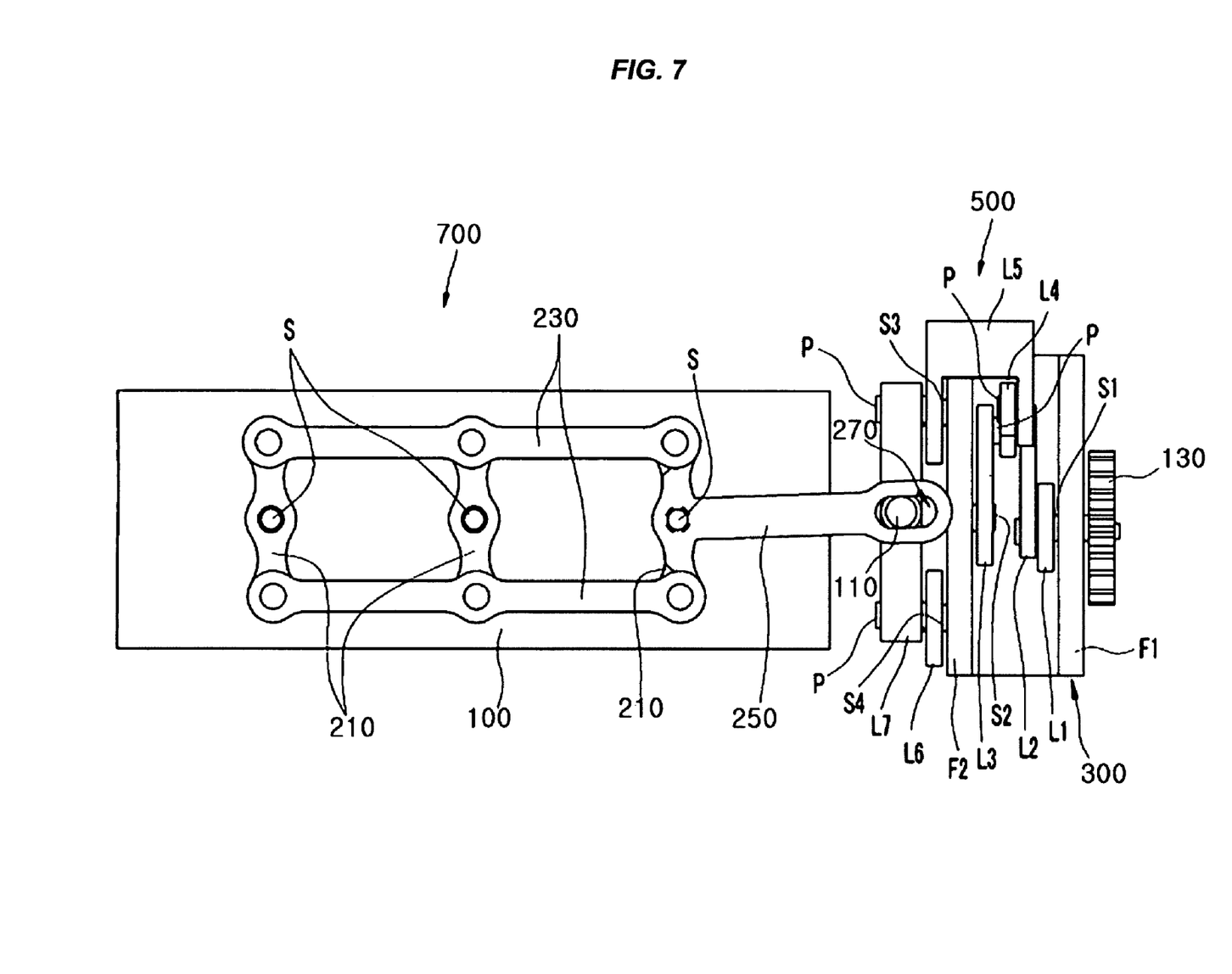
FIGS. 7 and 8 are a top plan view and a front view of the exemplary impulse charger of FIGS. 5 and 6, respectively.
Figure 8:
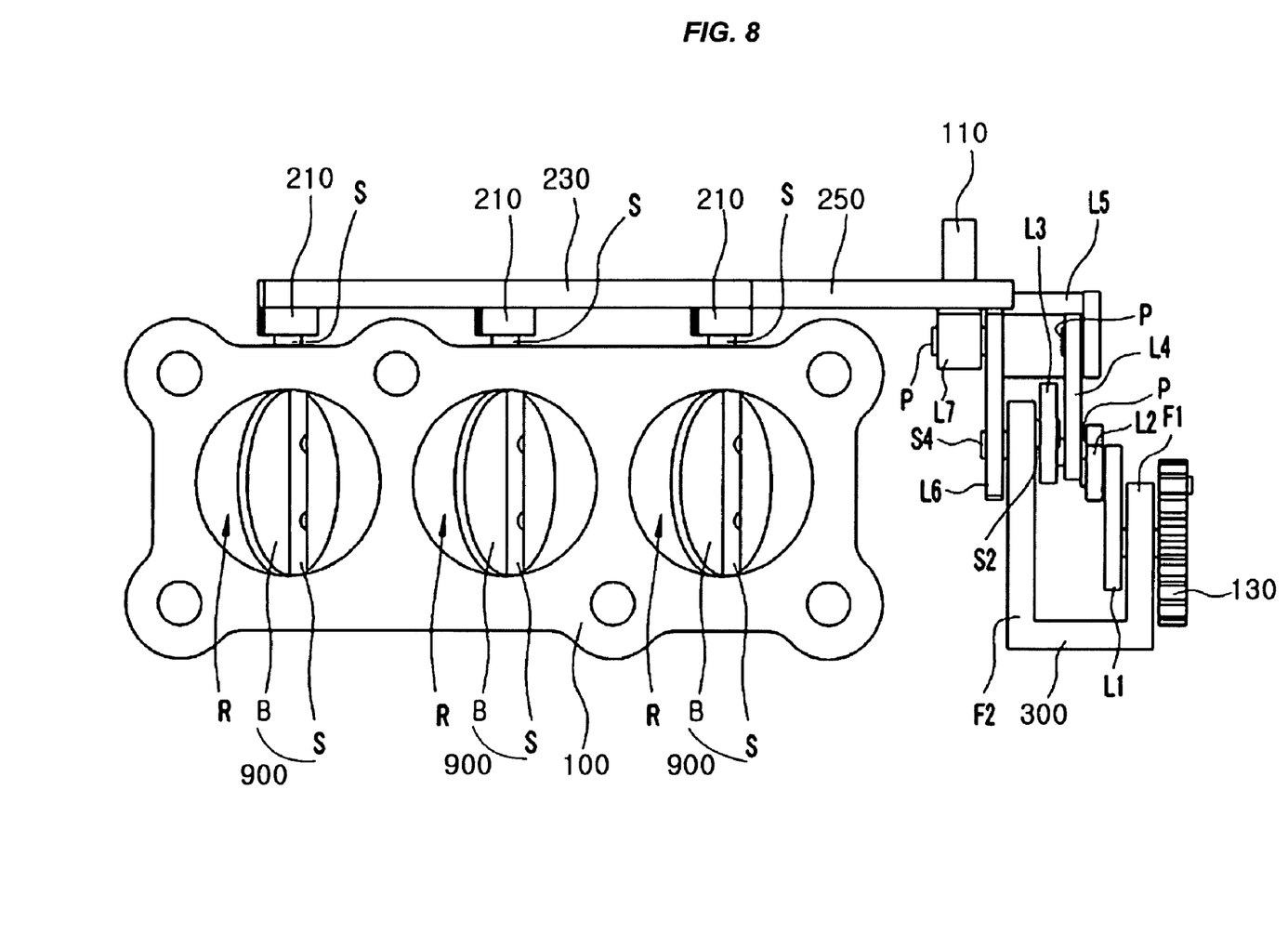
Figure 9:
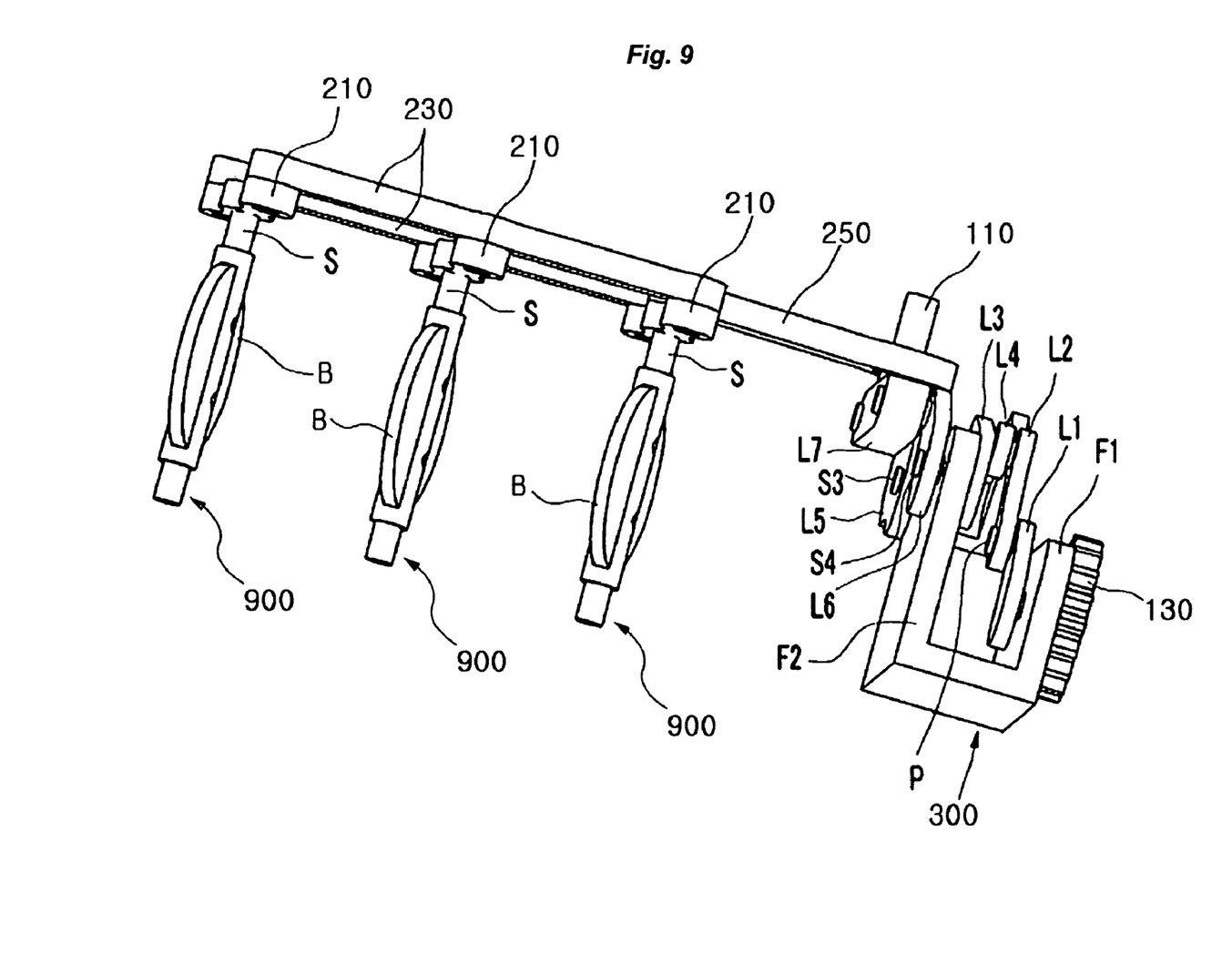
FIGS. 9 and 10 are perspective views of a link unit and a lever unit of the exemplary impulse charger of FIGS. 5 and 6.
Figure 10:
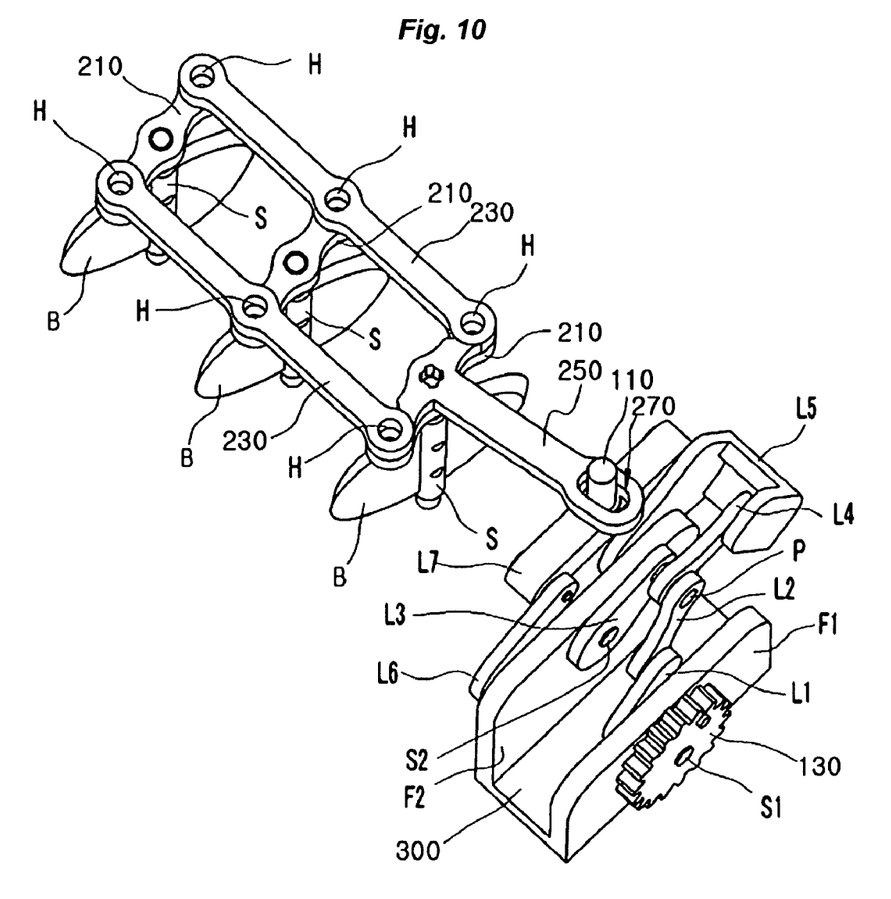
Figure 11:
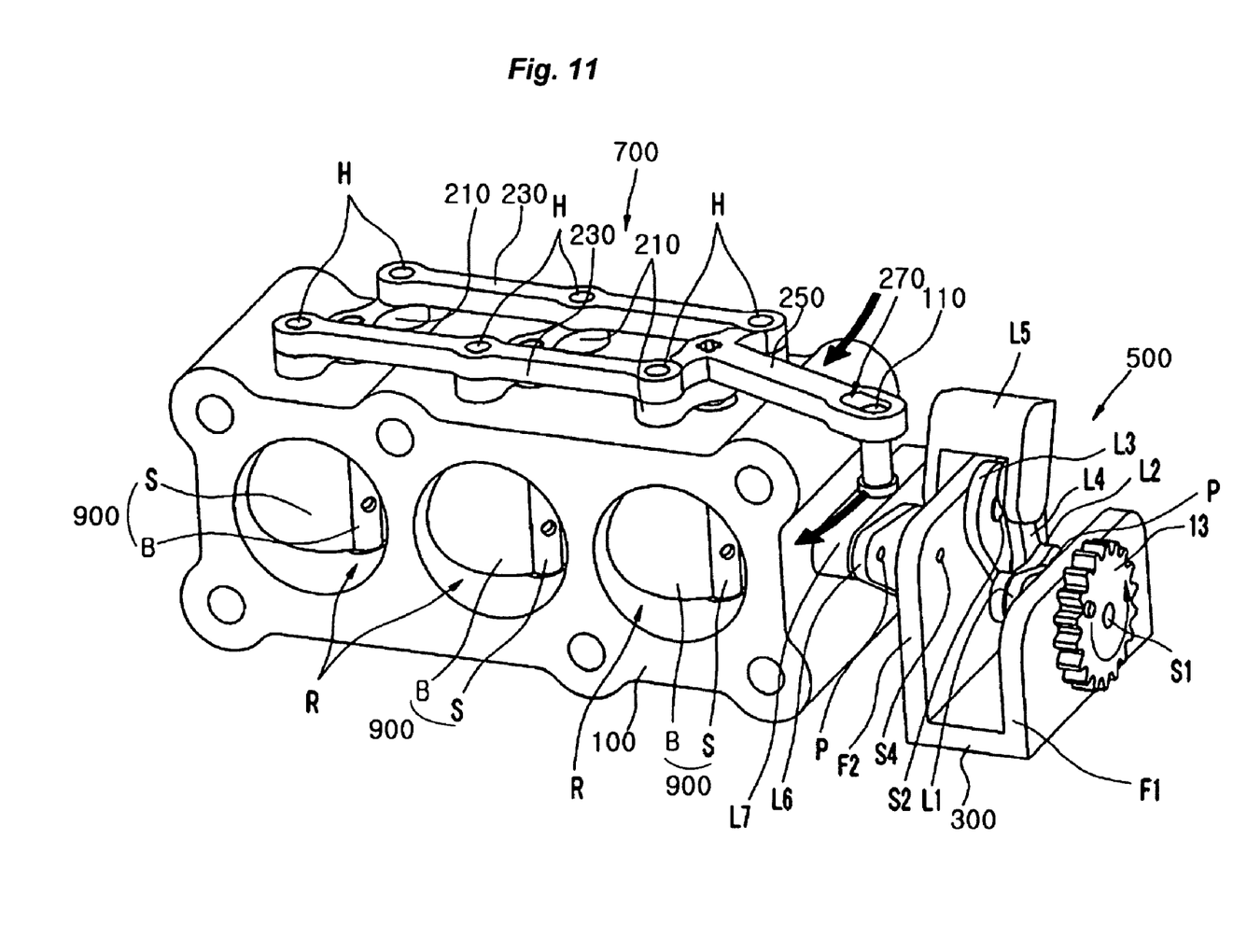
FIGS. 11 and 12 are operational diagrams illustrating the exemplary impulse charger of FIGS. 5 and 6.
Figure 12:
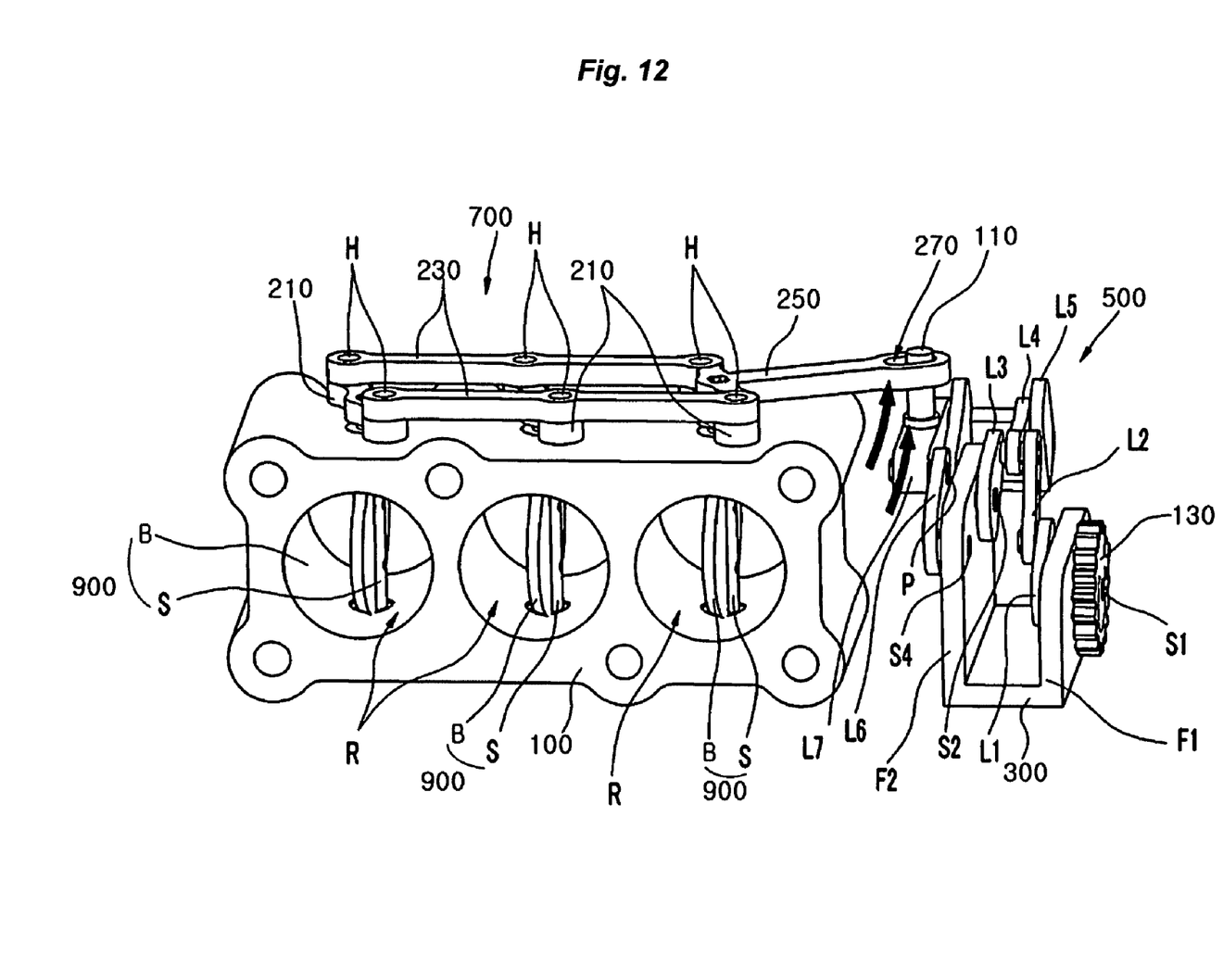

FIGS. 5 and 6 are top and bottom perspective views illustrating an impulse charger according to various embodiments of the present invention. FIGS. 7 and 8 are a top plan view and a front view of the impulse charger of FIGS. 5 and 6, respectively. FIGS. 9 and 10 are perspective views of a link unit and a lever unit of the impulse charger of FIGS. 5 and 6. FIGS. 11 and 12 are operational diagrams illustrating the impulse charger of FIGS. 5 and 6.

As illustrated in FIGS. 5 through 10, the impulse charger for motor vehicle engines according to this exemplary embodiment of the present invention is configured so that a mounting frame 300 is fixedly installed on one side of a cylinder head (not shown) corresponding to one side of an impulse block 100. The mounting frame 300 includes an outer frame F1 and an inner frame F2.

The mounting frame 300 is equipped with a link unit 500 according to other various embodiments of the present invention. The link unit 500 includes a driving shaft S1 installed on the outer frame F1, and a driven shaft S2 and first and second output shafts S3 and S4 installed on the inner frame F2. Further, the link unit 500 includes a plurality of links, which is interconnected through the driving and driven shafts S1 and S2 and through the first and second output shafts S3 and S4, and outputs a rotating force of the driving shaft S1 driven by a driving apparatus (not shown) as lateral force (applied in forward and backward directions) through a slide bar 110.

In detail, the link unit 500 is configured so that the driving shaft S1 is mounted on one side of the outer frame F1 of the mounting frame 300, that the driven shaft S2 is mounted on one side, i.e. an inner sidewall, of the inner frame F2 of the mounting frame 300, and that the first output shaft S3 and the second output shaft S4 are mounted on an outer sidewall of the inner frame F2 so as to be opposite each other.

A driving wheel 130 is mounted on the driving shaft S1 so as to face an outer sidewall of the outer frame F1. This driving wheel 130 is configured to receive the rotating force of a camshaft (not shown) as a driving apparatus through a timing belt (not shown).

A first link L1 is fixedly mounted to the driving shaft S1 at one end thereof so as to face the inner sidewall of the outer frame F1, and a second link L2 is rotatably mounted to the other end of the first link L1 through a link pin P at one end thereof.

A third link L3 is rotatably mounted to the outer frame F1 through the driven shaft S2 at one end thereof so as to face the inner sidewall of the outer frame F1, and the other end of the third link L3 is connected with the other end of the second link L2 through the link pin P.

A fourth link L4 is rotatably connected to the link pin P, through which the other ends of the second and third links L2 and L3 are connected to each other, at one end thereof.

The link unit 500 includes a fifth link L5 having a "C" or "U" shape. One end of the fifth link L5 is rotatably connected to the other end of the fourth link L4 through another link pin P, and the other end of the fifth link L5 is rotatably connected to the inner frame F2 through the first output shaft S3 so as to face the outer sidewall of the inner frame F2.

Further, a sixth link L6 is rotatably connected to the inner frame F2 through the second output shaft S4 at one end thereof so as to face the outer sidewall of the inner frame F2. One end of the fifth link L5 and the other end of the sixth link L6 are connected to respective opposite ends of a connecting link L7 through link pins P. The connecting link L7 is integrally coupled with the slide bar 110 substantially in the middle of the top face thereof. Thereby, the above-mentioned link unit 500 is configured.

Meanwhile, the impulse block 100 is provided with intake holes R, in each of which an impulse valve 900 is rotatably mounted, wherein the impulse valve 900 includes a valve rotating shaft S and a baffle B capable of opening or closing the corresponding intake hole R by means of rotation of the valve rotating shaft S.

The impulse block 100 is equipped with a lever unit 700 on an upper portion thereof. The lever unit 700 is coupled to the valve rotating shafts S of the impulse valves 900, and opens or closes the impulse valves 900 by using the lateral force of the slide bar 100.

In detail, the lever unit 700 installed on the upper portion of the impulse block 100 is configured so that the valve rotating shafts S of the impulse valves 900 are coupled to the middles of respective link levers 210, and that the link levers 210 are coupled to the connecting levers 230 disposed in parallel to each other through hinge pins H at opposite ends thereof.

An operating lever 250 is disposed between the right-hand one of the link levers 210 and the slide bar 110. The operating lever 250 is connected to right-hand ends of the opposite connecting levers 230 via the right-hand link lever 210 at one end thereof in the state in which the valve rotating shaft S of the impulse valve 900 is mounted on the middle of the right-hand link lever 210.

Further, the other end of the operating lever 250 is provided with a slot 270, into which the slide bar 110 is fitted.

Thus, as for the operation of the impulse charger for motor vehicle engines having the aforementioned configuration, as illustrated in FIGS. 11 and 12, the rotating force of the camshaft (not shown) which is transmitted through the driving wheel 130 is transmitted as the lateral force to the lever unit 700 through the link unit 500. The lateral force transmitted to the lever unit 700 is again transmitted as the rotating force to the valve rotating shafts S of the impulse valves 900. Thereby, the impulse valves 900 control the opening or closing of the respective intake holes R according to the rotational timing of the camshaft (not shown), thereby improving volume efficiency of the intake holes R.

In other words, the link unit 500 is operated in a manner such that, when the rotating force of the camshaft is transmitted to the driving shaft S1 through the driving wheel 130, the driving shaft S1 rotates the first link L1.

Then, the second link L2 rotates around the driving shaft S1 between the first link L1 and the third link L3, and thereby rotates the fourth link L4 coupled through the link pin P connecting the second link L2 and the third link L3.

Thus, the fifth link L5 rotates around the first output shaft S3 at a predetermined angle in the state in which it is connected with the fourth link L4, and thus transmits the lateral force to the connecting link L7 coupled to the sixth link L6.

At this time, the lateral force of the connecting link L7 is transmitted as the rotating force to the operating lever 250 of the lever unit 700 through the slide bar 110 within a predetermined section. As the operating lever 250 is repeatedly pivoted, the link levers 210 coupled by the connecting levers 230 repeatedly pivot within a predetermined angle.

Then, the impulse valves 900, which are coupled to the respective link levers 210 through the corresponding valve rotating shafts S, repeatedly rotate in the respective intake holes R, thereby controlling the opening or closing of the respective intake holes R.

Thus, the impulse charger of the present invention is expected that it will exert a remarkable effect on low-speed and middle-speed performances in a natural intake system. The impulse charger reinforces fluidity in a combustion chamber due to a sharp increase in the flow rate of inhaled air when the impulse valves 900 are opened, so that it is advantageous to improve combustion characteristics that cause trouble at low speed and high speed (e.g. knocking in fast burn). If an existing device such as a continuous variable valve timing (CVVT) mechanism is mounted on the driving apparatus, thereby optimizes the lift time of the valve, the volume efficiency can be improved up to maximum 15%.

Further, the impulse charger is designed so as to avoid direct friction between the impulse valves 900 and the inner walls of the intake holes R, so that it is advantageous in the light of noise or durability.

For convenience in explanation and accurate definition in the appended claims, the terms "upper", "front", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An impulse charger for motor vehicle engines, which is mounted so as to communicate with intake runners of the engine, and controls opening and closing of the intake runners to increase volume efficiency of intake air, the impulse charger comprising:
    an impulse block, through which intake holes pass so as to communicate with the intake runners;
    an impulse valve, which opens and closes the intake holes;
    a driving apparatus, which generates a continuous driving force and drives the impulse valve; and
    at least one link unit, which is connected by at least one link member, and transmits the driving force from the driving apparatus to the impulse valve;
    wherein the continuous driving force generated by the driving apparatus is transferred through the link unit, and is transmitted to the impulse valve such that the impulse valve is opened and closed at predetermined periods.

2. The impulse charger according to claim 1, wherein the impulse valve includes:
    valve rotating shafts, which are rotatably coupled to the impulse block across the intake holes; and
    baffles, which are mounted on outer circumferences of the valve rotating shaft in a direction perpendicular to each axis of the valve rotating shafts, and open and close the intake holes by means of rotation of the valve rotating shafts;
    wherein the valve rotating shafts receive a rotating force through the link unit.

3. The impulse charger according to claim 2, wherein the driving apparatus generates the rotating force in a one-way direction, and the one-way rotating force generated by the driving apparatus is transmitted as a reciprocating-rotating force to the valve rotating shafts through the link unit, so as to open and close the intake holes.

4. The impulse charger according to claim 3, wherein the intake holes formed in the impulse block are equal in number to the intake runners of the engine, the valve rotating shafts are mounted corresponding to a number obtained by dividing a total number of the intake holes by a number of the intake holes that are simultaneously opened and closed, and each of the valve rotating shafts is formed with part of the baffles capable of opening and closing part of the intake holes that are simultaneously opened and closed.

5. The impulse charger according to claim 4, wherein the link units are equal in number to the valve rotating shafts, and transmit the rotating force to the respective valve rotating shafts.

6. The impulse charger according to claim 2, wherein the link unit includes:
- a driving link and an output link, which are mounted to a driving shaft and an output shaft so as to be able to be rotated around the driving shaft and the output shaft, respectively, the driving shaft and the output shaft being rotatably fixed;
- a driven link, which rotates around a fixed driven shaft;
- a first link plate, which is rotatably connected to first ends of the driving link and the driven link; and
- a second link plate, which is rotatably connected to first ends of the driven link and the output link;
- wherein the driven link performs rotation and reciprocation with acceleration within a predetermined section when the driving link rotates at a constant speed in one direction, and the output link rotates and reciprocates with greater acceleration than that of the driven link within a predetermined section.

7. The impulse charger according to claim 6, wherein the valve rotating shafts are coupled with the output shaft so as to rotate together with the output shaft.

8. The impulse charger according to claim 2, wherein each intake hole is recessed along a rotational path of the corresponding baffle.

9. The impulse charger according to claim 1, further comprising:
- a mounting frame, which is fixedly installed on one side of a cylinder head corresponding to one side of the impulse block, and includes an outer frame and an inner frame; and
- a lever unit, which is installed on an upper portion of the impulse block, and is connected with the valve rotating shafts of the impulse valves;
- wherein the link unit includes a plurality of links, which is coupled to the driving and driven shafts through the output shafts and the outer and inner frame of the mounting frame, and which outputs the rotating force of the driving shaft driven by the driving apparatus as lateral force through a slide bar, and the lever unit opens and closes the impulse valves using the lateral force of the slide bar.

10. The impulse charger according to claim 9, wherein the link unit includes:
- the driving shaft, which is mounted on one side of the outer frame of the mounting frame;
- the driven shaft, which is mounted on an inner sidewall of the inner frame of the mounting frame;
- the first and second output shafts, which are mounted on an outer sidewall of the inner frame of the mounting frame so as to be opposite each other;
- a driving wheel, which is mounted on the driving shaft so as to face an outer sidewall of the outer frame, and receives a rotating force of a camshaft through a timing belt;
- a first link, which is fixedly mounted to the driving shaft at one end thereof so as to face the inner sidewall of the outer frame;
- a second link, which is rotatably mounted to the other end of the first link through a link pin at one end thereof;
- a third link, which is rotatably mounted to the driven shaft at one end thereof so as to face the inner sidewall of the inner frame, and is connected with the other end of the second link through the link pin at another end thereof;
- a fourth link, which is rotatably connected to the link pin, through which the other ends of the second and third links are connected to each other, at one end thereof;
- a fifth link having a "C" shape is rotatably connected to the other end of the fourth link through another link pin at one end thereof and to the first output shaft so as to face the outer sidewall of the inner frame at another end thereof;
- a sixth link, which is rotatably connected to the second output shaft at one end thereof so as to face the outer sidewall of the inner frame; and
- a connecting link, which are connected with one end of the fifth link and the other end of the sixth link through link pins at respective opposite ends thereof, and is integrally coupled with the slide bar substantially in a middle of a top face thereof.

11. The impulse charger according to claim 9, wherein the lever unit includes:
- link levers disposed in parallel, middles of which are coupled to the valve rotating shafts of the impulse valves on the upper portion of the impulse block;
- connecting levers, which are coupled to opposite ends of the link levers through hinge pins and are disposed in parallel; and
- an operating lever, which is connected to first ends of the connecting levers via one of the link levers, on a middle of which the valve rotating shaft of the impulse valve is mounted, at one end thereof, and is fitted around the slide bar through a slot formed in another end thereof.

12. The impulse charger according to claim 1, wherein the driving apparatus comprises a camshaft providing a driving wheel with the rotating force through a timing belt.

13. The impulse charger according to claim 1, wherein the driving apparatus comprises a motor generating a predetermined rotating force.

14. An engine comprising the impulse charger of claim 1.

15. The engine according to claim 14, wherein the impulse valve comprises:
- valve rotating shafts, which are rotatably coupled to the impulse block across the intake holes; and
- baffles, which are mounted on outer circumferences of the valve rotating shaft in a direction substantially perpendicular to each axis of the valve rotating shafts, wherein the baffles open and close the intake holes by means of rotation of the valve rotating shafts;
- wherein the valve rotating shafts receive a rotating force through the link unit.

16. The engine according to claim 14, further including:
- a mounting frame mounted on one side of a cylinder head corresponding to one side of the impulse block, wherein the mounting frame includes an outer frame and an inner frame; and
- a lever unit mounted on an upper portion of the impulse block and connected with the valve rotating shafts of the impulse valves;
- wherein the link unit includes a plurality of links coupled to the driving and driven shafts through the output shafts and the outer and inner frame of the mounting frame, wherein the link unity outputs the rotating force of the driving shaft driven by the driving apparatus as a lateral force through a slide bar, and the lever unit opens and closes the impulse valves using the lateral force of the slide bar.

* * * * *